(12) United States Patent
Matsuzaki

(10) Patent No.: US 12,113,400 B2
(45) Date of Patent: Oct. 8, 2024

(54) ROTOR, ROTARY ELECTRIC MACHINE, AND DRIVE APPARATUS

(71) Applicant: NIDEC CORPORATION, Kyoto (JP)

(72) Inventor: Ryosuke Matsuzaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 226 days.

(21) Appl. No.: 17/893,174

(22) Filed: Aug. 23, 2022

(65) Prior Publication Data

US 2023/0068403 A1 Mar. 2, 2023

(30) Foreign Application Priority Data

Aug. 24, 2021 (JP) .................................. 2021-136197

(51) Int. Cl.
*H02K 1/32* (2006.01)
*H02K 1/276* (2022.01)
*H02K 7/116* (2006.01)
*H02K 9/19* (2006.01)

(52) U.S. Cl.
CPC ............. *H02K 1/32* (2013.01); *H02K 1/276* (2013.01); *H02K 7/116* (2013.01); *H02K 9/19* (2013.01); *H02K 2201/06* (2013.01)

(58) Field of Classification Search
CPC ...... H02K 1/276; H02K 1/2766; H02K 7/116; H02K 9/19; H02K 2201/06
See application file for complete search history.

(56) References Cited

U.S. PATENT DOCUMENTS

| | | | | |
|---|---|---|---|---|
| 6,323,613 B1* | 11/2001 | Hara | ...................... | H02K 16/00 903/952 |
| 6,897,581 B2* | 5/2005 | Doherty | ................. | H02K 19/38 310/59 |
| 8,242,645 B2* | 8/2012 | Tatematsu | ................ | H02K 1/32 310/52 |
| 9,303,698 B2* | 4/2016 | Sugiyama | ........... | F16H 57/0445 |
| 2013/0145879 A1* | 6/2013 | Nakamura | .......... | F16H 57/0441 74/467 |
| 2020/0280227 A1 | 9/2020 | Ochiai | | |

FOREIGN PATENT DOCUMENTS

| | | |
|---|---|---|
| JP | 2019161750 A | 9/2019 |
| WO | 2022107370 A1 | 5/2022 |

* cited by examiner

*Primary Examiner* — Jue Zhang
(74) *Attorney, Agent, or Firm* — HAUPTMAN HAM, LLP

(57) ABSTRACT

A rotor includes a shaft, a rotor core with core pieces arranged axially, and a plate between adjacent core pieces and surrounding the shaft. The shaft includes an axial first hole, and a second hole opened to outside of the shaft and connected to the first hole. One side of the plate in the axial direction has a first surface at an inner edge of the plate, and a second surface radially outward from the first surface. The first and second surfaces are away from the core piece, which is on the one side of the plate in the axial direction, toward the other side. The plate includes through-holes on the second surface and arranged circumferentially at intervals, and a plate wall protruding to one side in the axial direction from a portion of the first surface positioned radially outward from an inner edge.

18 Claims, 9 Drawing Sheets

ROTOR, ROTARY ELECTRIC MACHINE, AND DRIVE APPARATUS

CROSS-REFERENCE TO RELATED APPLICATIONS

The present invention claims priority under 35 U.S.C. § 119 to Japanese Patent Application No. 2021-136197 filed on Aug. 24, 2021, the entire content of which is incorporated herein by reference.

FIELD OF THE INVENTION

The present invention relates to a rotor, a rotary electric machine, and a drive apparatus.

BACKGROUND

A rotary electric machine in which a refrigerant flow path through which a refrigerant is supplied and a refrigerant supply portion that supplies the refrigerant to a rotor core are provided in a rotor shaft has known. For example, a conventional rotary electric machine includes a refrigerant distribution plate on which a connection flow path connecting a refrigerant supply portion of a rotor shaft and a plurality of in-core flow paths extending in an axial direction inside a rotor core.

In the rotary electric machine described above, the refrigerant supplied to the in-core flow paths via the refrigerant distribution plate may vary. Thus, the refrigerant supplied to a part of the in-core flow paths is reduced, and there is a concern that the refrigerant cannot be suitably supplied to the rotor core.

SUMMARY

One exemplary aspect of the present invention is a rotor that is rotatable about a central axis. The rotor includes a shaft that extends in an axial direction, a rotor core that has a plurality of core pieces arranged in the axial direction and is fixed to an outer peripheral surface of the shaft, and an annular plate that is arranged between the core pieces adjacent in the axial direction and surrounds the shaft. The shaft includes a first shaft hole that extends in the axial direction, and a second shaft hole that has an opening opened to the outer peripheral surface of the shaft and is connected to the first shaft hole. A surface on one side of the plate in the axial direction has a first surface that is provided at an inner edge of the plate in a radial direction and extends in a circumferential direction, and a second surface that is positioned on an outside, in the radial direction, with respect to the first surface. the first surface and the second surface are arranged away from the core piece, which is positioned on the one side of the plate in the axial direction, toward another side in the axial direction. The plate includes a plurality of plate through-holes that are provided on the second surface and are arranged at intervals in the circumferential direction, and a plate wall that protrudes to one side in the axial direction from a portion of the first surface positioned on an outside, in the radial direction, with respect to an inner edge in the radial direction, and extends in the circumferential direction.

One exemplary aspect of a rotary electric machine according to the present invention includes the above rotor, and a stator that is opposite to the rotor with a gap interposed therebetween.

One exemplary aspect of a drive apparatus according to the present invention includes the above rotary electric machine, and a gear mechanism connected to the rotary electric machine.

The above and other elements, features, steps, characteristics and advantages of the present disclosure will become more apparent from the following detailed description of the preferred embodiments with reference to the attached drawings.

DETAILED DESCRIPTION

Figure 1:
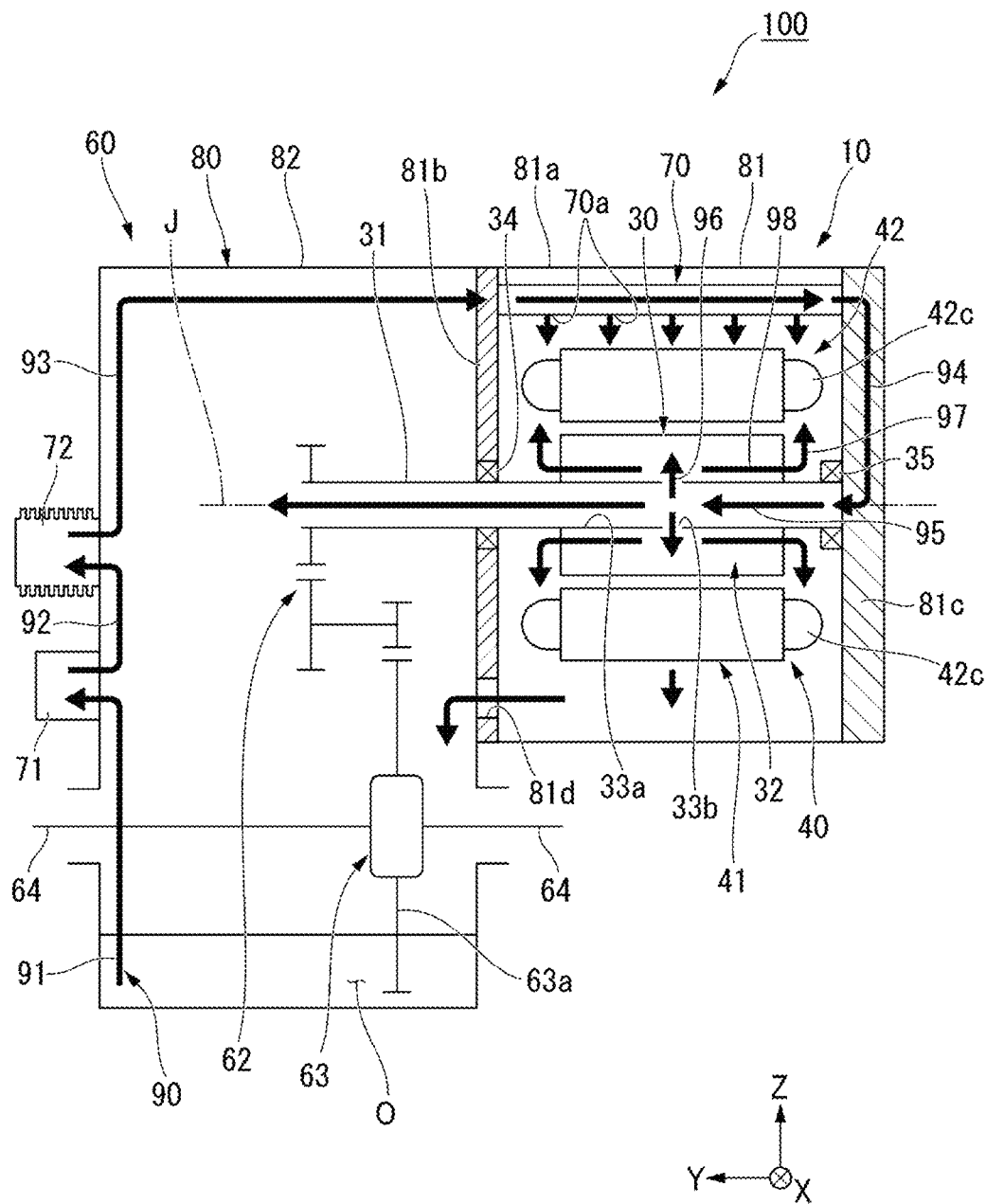
FIG. 1 is a cross-sectional view schematically illustrating a drive apparatus according to a first embodiment.

The following description will be made with a vertical direction being defined on the basis of positional relationships in the case where a drive apparatus according to embodiments is mounted in a vehicle positioned on a horizontal road surface. That is, it is sufficient that the relative positional relationships regarding the vertical direction described in the following embodiments are satisfied at least in the case where the drive apparatus is mounted in the vehicle positioned on the horizontal road surface.

In the drawings, an XYZ coordinate system is illustrated appropriately as a three-dimensional orthogonal coordinate system. In the XYZ coordinate system, a Z-axis direction corresponds to the vertical direction. A +Z side is an upper side in the vertical direction, and a −Z side is a lower side in the vertical direction. In the following description, the upper side and the lower side in the vertical direction will be referred to as simply the "upper side" and the "lower side", respectively. An X-axis direction corresponds to a front-rear direction of the vehicle in which the drive apparatus is mounted, i.e., a direction perpendicular to the Z-axis direction. In the following embodiments, a +X side corresponds to a forward side in the vehicle, while a −X side corresponds to a rearward side in the vehicle. A Y-axis direction corresponds to a left-right direction of the vehicle, i.e., a width direction of the vehicle, and is a direction perpendicular to both the X-axis direction and the Z-axis direction. In the following embodiments, a +Y side corresponds to the left side in the vehicle, while a −Y side corresponds to the right side in the vehicle. Each of the front-rear direction and the left-right direction is a horizontal direction perpendicular to the vertical direction.

Note that, the positional relationships in the front-rear direction are not limited to the positional relationships of the following embodiments, and the +X side and the −X side may correspond to the rearward side and the forward side, respectively, of the vehicle. In this case, the +Y side corresponds to the right side of the vehicle, while the −Y side corresponds to the left side of the vehicle. In the present specification, a "parallel direction" includes a substantially parallel direction, and an "orthogonal direction" includes a substantially orthogonal direction.

A central axis J illustrated in the drawings as appropriate is a virtual axis extending in a direction intersecting the vertical direction. More specifically, the central axis J extends in the Y-axis direction orthogonal to the vertical direction, i.e., in the left-right direction of the vehicle. In the following description, unless otherwise particularly stated, a direction parallel to the central axis J is simply referred to as an "axial direction", a radial direction about the central axis J is simply referred to as a "radial direction", and a circumferential direction about the central axis J, i.e., a direction around the central axis J is simply referred to as a "circumferential direction".

Note that, in the following embodiment, the left side (+Y side) corresponds to "one side in the axial direction", and the right side (−Y side) corresponds to the "other side in the axial direction".

FIG. 1 illustrates a drive apparatus 100 according to the present embodiment that is mounted in a vehicle and rotates an axle 64. The vehicle in which the drive apparatus 100 is mounted is a vehicle including a motor as a power source, such as a hybrid vehicle (HEV), a plug-in hybrid vehicle (PHV), or an electric vehicle (EV). As illustrated in FIG. 1, the drive apparatus 100 includes a rotary electric machine 10, a housing 80, a gear mechanism 60, and a flow path 90. The rotary electric machine 10 includes a rotor 30 rotatable about the central axis J, and a stator 40 positioned on the outside of the rotor 30 in the radial direction. Configurations other than the above configurations of the rotary electric machine 10 will be described later.

The housing 80 accommodates the rotary electric machine 10 and the gear mechanism 60. The housing 80 includes a motor housing 81, and a gear housing 82. The motor housing 81 is a housing that internally accommodates the rotor 30 and the stator 40. The motor housing 81 is connected to the gear housing 82 on the right side. The motor housing 81 has a peripheral wall 81a, a partition wall 81b, and a lid 81c. The peripheral wall 81a and the partition wall 81b are each, for example, a part of a single member. The lid 81c is separate from, for example, the peripheral wall 81a and the partition wall 81b.

The peripheral wall 81a has a cylindrical shape that surrounds the central axis J and is opened toward the right side. The partition wall 81b is connected to an end on the left side of the peripheral wall 81a. The partition wall 81b partitions an inside of the motor housing 81 and an inside of the gear housing 82 in the axial direction. The partition wall 81b has a partition wall opening 81d that connects the inside of the motor housing 81 with the inside of the gear housing 82. The partition wall 81b holds a bearing 34. The lid 81c is fixed to an end on the right side of the peripheral wall 81a. The lid 81c closes a right opening of the peripheral wall 81a. The lid 81c holds a bearing 35.

The gear housing 82 accommodates a speed reducer 62 and a differential gear 63, which will be described later, of the gear mechanism 60 and an oil O therein. The oil O is stored in a lower region in the gear housing 82. The oil O is circulated through the flow path 90, which will be described below. The oil O is used as a refrigerant for cooling the rotary electric machine 10. The oil O is also used as a lubricating oil for the speed reducer 62 and the differential gear 63. As the oil O, for example, an oil equivalent to an automatic transmission fluid (ATF) having a relatively low viscosity is preferably used to function as a refrigerant and a lubricating oil.

The gear mechanism 60 is connected to the rotary electric machine 10 and transmits the rotation of the rotor 30 to the axle 64 of the vehicle. The gear mechanism 60 according to the present embodiment includes the speed reducer 62 connected to the rotary electric machine 10, and the differential gear 63 connected to the speed reducer 62. The differential gear 63 includes a ring gear 63a. In the ring gear 63a, torque output from the rotary electric machine 10 is transmitted via the speed reducer 62. An end on the lower side of the ring gear 63a is immersed in the oil O stored in the gear housing 82. The ring gear 63a rotates, and thus, the oil O is scraped up. The oil O scraped up is supplied, as a lubricating oil, to, for example, the speed reducer 62 and the differential gear 63.

Figure 2:
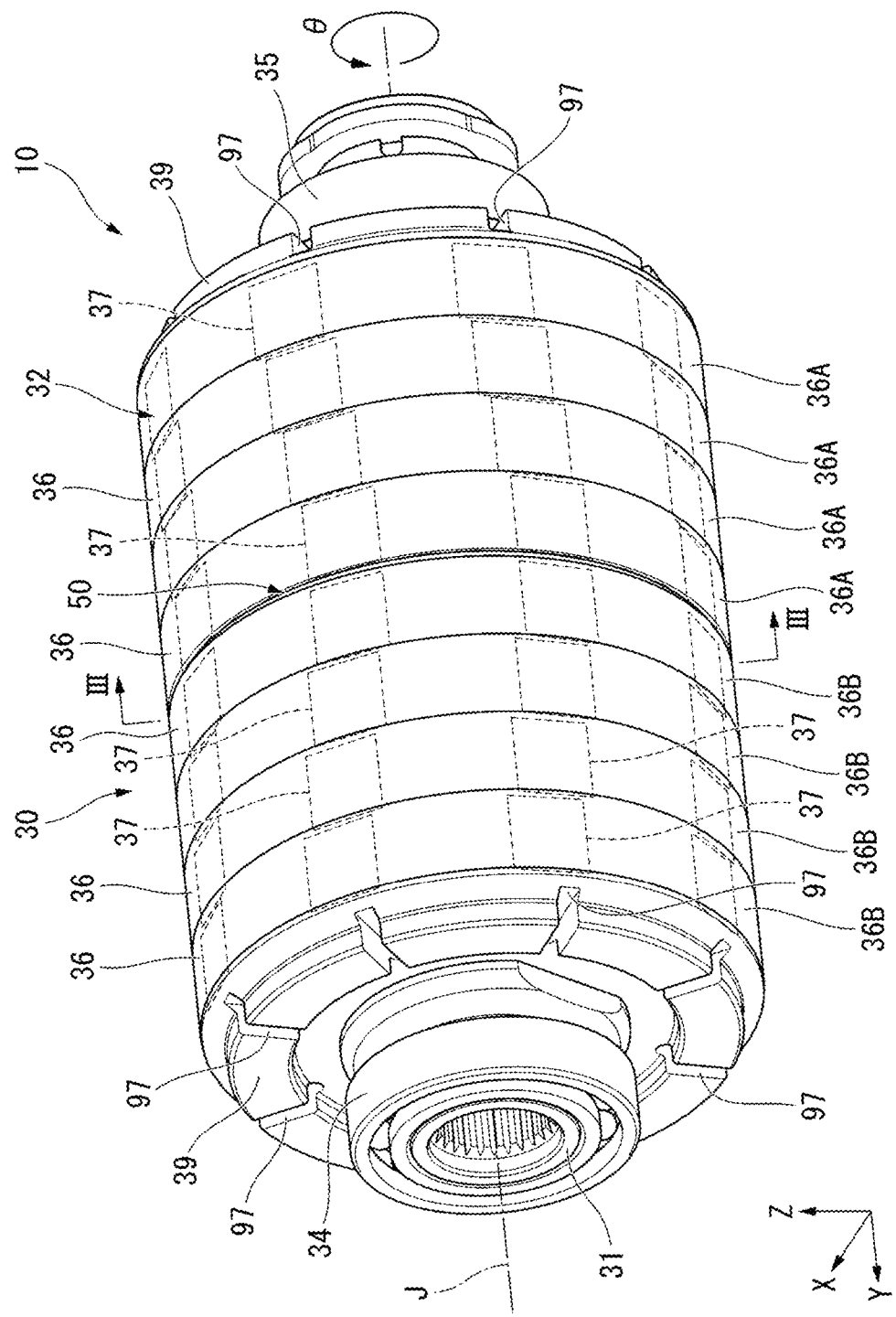
FIG. 2 is a perspective view illustrating a rotor according to the first embodiment.

The rotary electric machine 10 is a portion that drives the drive apparatus 100. The rotary electric machine 10 is positioned, for example, on the right side of the gear mechanism 60. In the present embodiment, the rotary electric machine 10 is a motor. The torque of the rotor 30 of the rotary electric machine 10 is transmitted to the gear mechanism 60. The rotor 30 includes a shaft 31 extending in the axial direction about the central axis J, and a rotor core 32 fixed to an outer peripheral surface of the shaft 31. As illustrated in FIG. 2, the rotor 30 includes a plurality of magnets 37 held by the rotor core 32, end plates 39 arranged at both ends in the axial direction of the rotor core 32, and a plate 50.

As illustrated in FIG. 1, the shaft 31 is rotatable about the central axis J. The shaft 31 is rotatably supported by the bearings 34 and 35. In the present embodiment, the shaft 31 is a hollow shaft. The shaft 31 has a cylindrical shape through which the oil O as a refrigerant can flow. The shaft 31 extends across the inside of the motor housing 81 and the inside of the gear housing 82. An end on the left side of the shaft 31 protrudes into the gear housing 82. The speed reducer 62 is connected to the end on the left side of the shaft 31.

The shaft 31 has a first shaft hole 33a extending in the axial direction. An inside of the first shaft hole 33a is formed by the inside of the shaft 31 that is the hollow shaft. In the present embodiment, the first shaft hole 33a is a hole penetrating the shaft 31 in the axial direction, and is opened on both sides in the axial direction. In the present embodiment, the first shaft hole 33a is a circular hole about the central axis J.

Figure 3:
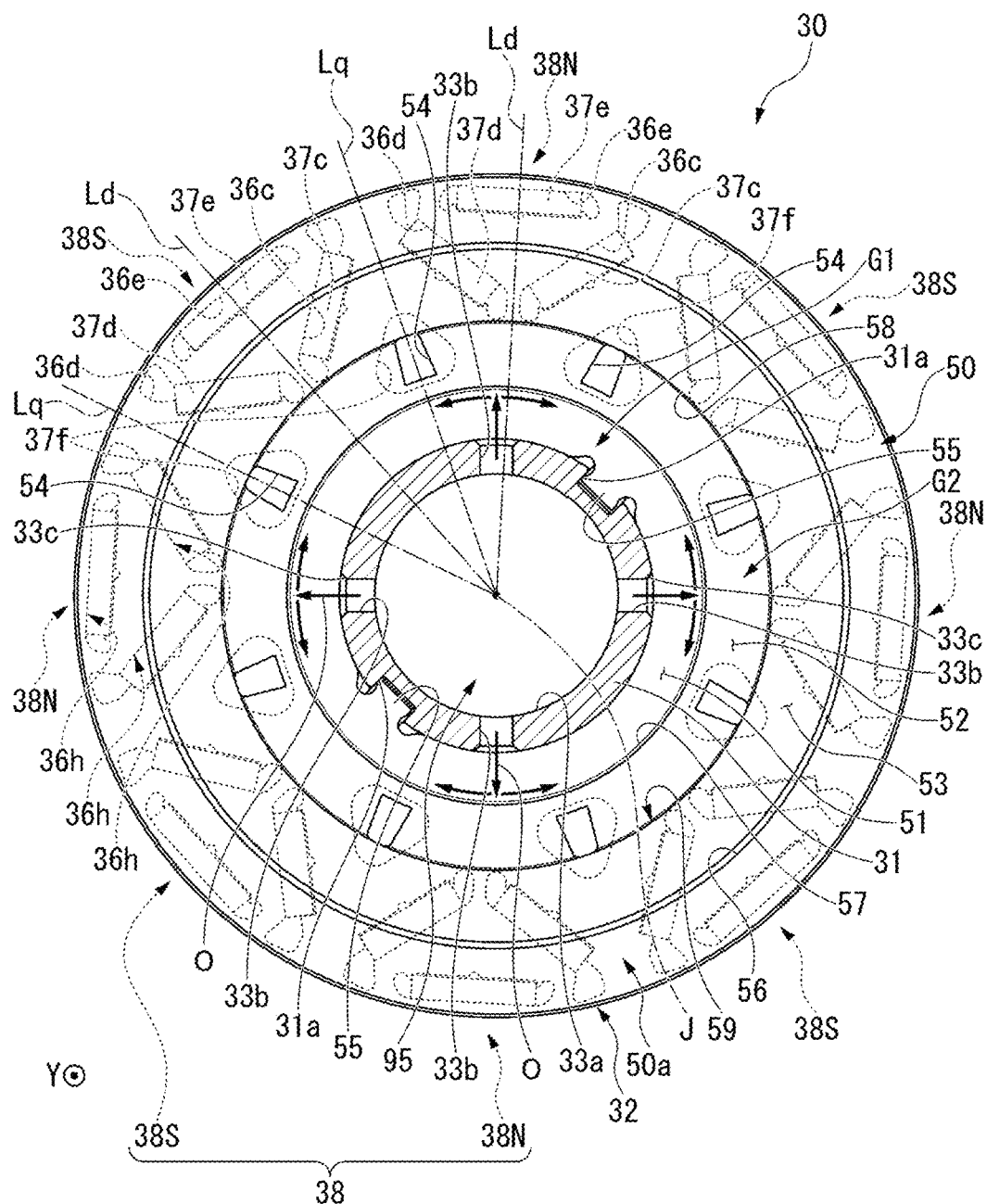
FIG. 3 is a cross-sectional view illustrating the rotor according to the first embodiment, and is a III-III cross-sectional view in FIG. 2.
Figure 4:
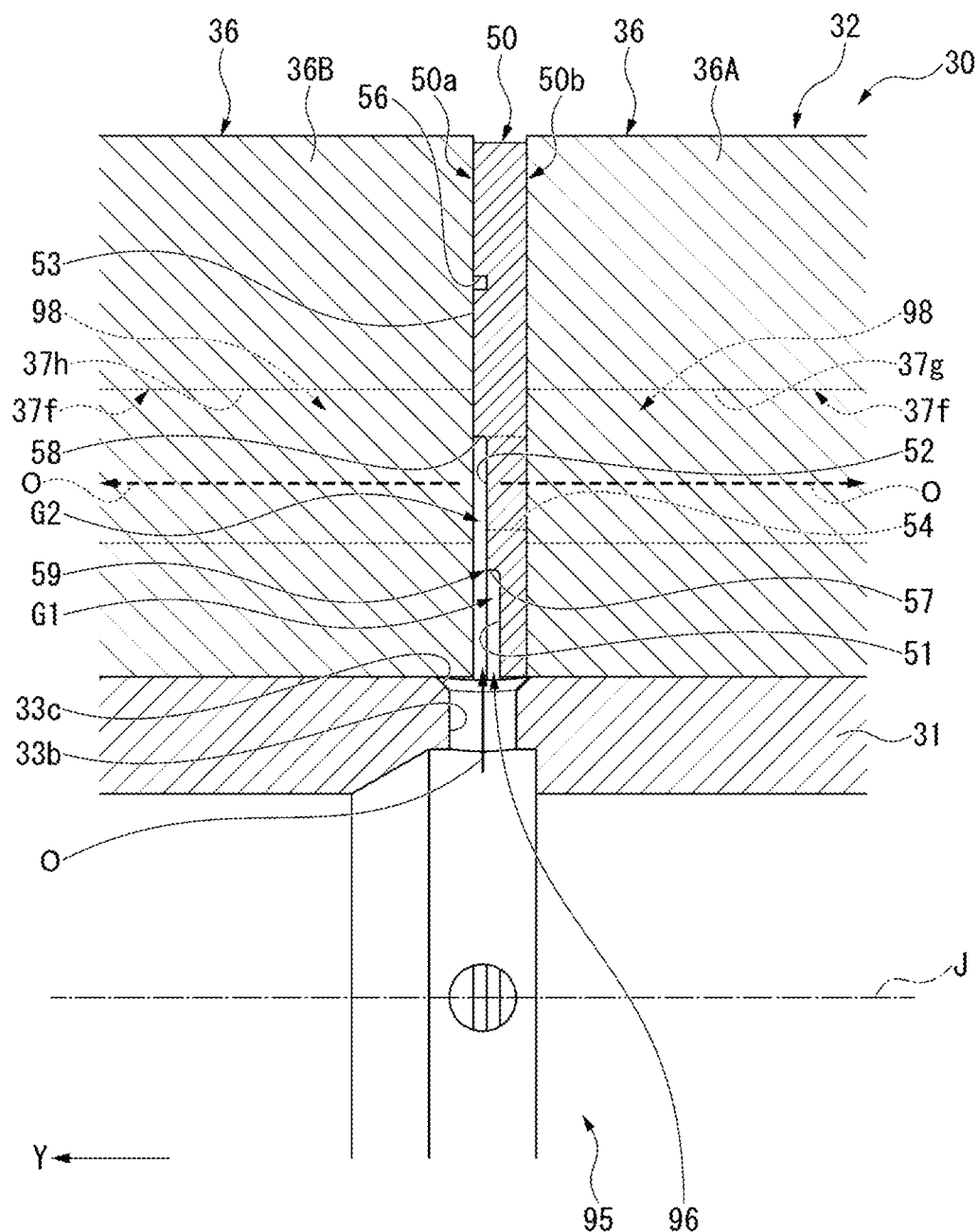
FIG. 4 is a cross-sectional view illustrating a part of the rotor according to the first embodiment.

The shaft 31 has a second shaft hole 33b connected to the first shaft hole 33a. The second shaft hole 33b is a hole that penetrates a wall of the shaft 31 in the radial direction from an inner peripheral surface of the shaft 31 to an outer peripheral surface of the shaft 31. In the present embodiment, the second shaft hole 33b is a circular hole. As illustrated in FIGS. 3 and 4, the second shaft hole 33b has an opening 33c opened in the outer peripheral surface of the shaft 31. An inner diameter of the opening 33c increases toward the outside in the radial direction. As illustrated in FIG. 3, in the present embodiment, a plurality of second shaft holes 33b are provided along the circumferential direction. The plurality of second shaft holes 33b are arranged at equal intervals over the entire circumference along the circumferential direction. In the present embodiment, four second shaft holes 33b are provided. A position of the opening 33c of each of the second shaft holes 33b in the circumferential direction is a position in the circumferential direction between plate through-holes 54, which will be described later, adjacent to each other in the circumferential direction.

As illustrated in FIG. 2, the rotor core 32 includes a plurality of core pieces 36 arranged in the axial direction. The core piece 36 is a magnetic body. The core piece 36 has a cylindrical shape about the central axis J, and has a cylindrical shape in the present embodiment. An inner peripheral surface of the core piece 36 is fixed to the outer peripheral surface of the shaft 31 by press fitting or the like. The core piece 36 and the shaft 31 are fixed so as to be relatively immovable in the axial direction, the radial direction, and the circumferential direction. Although not illustrated, the core piece 36 includes a plurality of electromagnetic steel plates arranged to overlap each other in the axial direction.

The plurality of core pieces 36 include a plurality of first core pieces 36A and a plurality of second core pieces 36B. The plurality of first core pieces 36A constitute a portion on the right side (−Y side) of the rotor core 32. The first core pieces 36A adjacent to each other in the axial direction are in contact with each other. The plurality of second core pieces 36B constitute a portion on the left side (+Y side) of the rotor core 32. The second core pieces 36B adjacent to each other in the axial direction are in contact with each other. The plate 50 is arranged between the plurality of first core pieces 36A and the plurality of second core pieces 36B in the axial direction. In the present embodiment, four first core pieces 36A and four second core pieces 36B are provided.

The plurality of first core pieces 36A are arranged to be shifted to one side (+θ side) in the circumferential direction with increasing a distance from the plate 50 to the right side (−Y side). Note that, the one side (+θ side) in the circumferential direction is a side that advances clockwise about the central axis J as viewed from the right side (−Y side) in the circumferential direction, that is, a side (+θ side) on which an arrow θ illustrated in FIG. 2 faces. The plurality of second core pieces 36B are arranged to be shifted to one side (+θ side) in the circumferential direction with increasing a distance to the left side (+Y side) from the plate 50. That is, in the present embodiment, a twist direction of a step skew of the plurality of first core pieces 36A arranged on the right side of the plate 50 is different from a twist direction of a step skew of the plurality of second core pieces 36B arranged on the left side of the plate 50. As a result, it is possible to obtain an effect that cogging torque and torque ripple can be reduced.

As illustrated in FIG. 3, the rotor core 32 has a plurality of magnet holes 36h. The plurality of magnet holes 36h penetrate the rotor core 32 in the axial direction, for example. The plurality of magnets 37 are accommodated in the plurality of magnet holes 36h, respectively. A method for fixing the magnet 37 in the magnet hole 36h is not particularly limited. The plurality of magnet holes 36h include a pair of first magnet holes 36c and 36d and a second magnet hole 36e.

The type of the plurality of magnets 37 is not particularly limited. The magnet 37 may be, for example, a neodymium magnet or a ferrite magnet. The plurality of magnets 37 include a pair of first magnets 37c and 37d arranged in the pair of first magnet holes 36c and 36d, respectively, and a second magnet 37e arranged in the second magnet hole 36e.

In the present embodiment, a plurality of pairs of first magnet holes 36c and 36d, a plurality of pairs of first magnets 37c and 37d, a plurality of second magnet holes 36e, and a plurality of second magnets 37e are provided at intervals in the circumferential direction. For example, eight pairs of first magnet holes 36c and 36d, eight pairs of first magnets 37c and 37d, eight second magnet holes 36e, and eight second magnet 37e are provided.

The rotor 30 has a plurality of magnetic poles 38 arranged at intervals in the circumferential direction. For example, eight magnetic poles 38 are provided. For example, the plurality of magnetic poles 38 are arranged at equal intervals over the entire circumference along the circumferential direction. The plurality of magnetic poles 38 include a plurality of magnetic poles 38N in which a magnetic pole on the outer peripheral surface of the rotor core 32 is an N pole and a plurality of magnetic poles 38S in which a magnetic pole on the outer peripheral surface of the rotor core 32 is an S pole. For example, four magnetic poles 38N and four magnetic poles 38S are provided. Four magnetic poles 38N and four magnetic poles 38S are alternately arranged along the circumferential direction. The configurations of the magnetic poles 38 are similar to one another except that the magnetic poles on the outer peripheral surface of the rotor core 32 are different and positions in the circumferential direction are different.

The magnetic pole 38 includes the magnet 37 and the magnet hole 36h in which the magnet 37 is arranged. In the present embodiment, the magnetic pole 38 includes the pair of first magnet holes 36c and 36d, the pair of first magnets 37c and 37d, the second magnet hole 36e, and the second magnet 37e one by one.

In the magnetic pole 38, the pair of first magnet holes 36c and 36d are arranged at intervals in the circumferential direction. The first magnet hole 36c and the first magnet hole 36d are arranged with a magnetic pole center line Ld interposed therebetween in the circumferential direction. The magnetic pole center line Ld is a virtual line passing through a center of the magnetic pole 38 in the circumferential direction and the central axis J and extending in the radial direction. The magnetic pole center line Ld is provided for each magnetic pole 38. The magnetic pole center line Ld passes through on a d axis of the rotor 30 as viewed in the axial direction. A direction where the magnetic pole center line Ld extends is a d-axis direction of the rotor 30. The first magnet hole 36c and the first magnet hole 36d are arranged line-symmetrically with respect to the magnetic pole center line Ld as viewed in the axial direction.

The pair of first magnet holes 36c and 36d extend in directions away from each other in the circumferential direction outward in the radial direction from the inside in the radial direction as viewed in the axial direction. That is, a distance in the circumferential direction between the first magnet hole 36c and the first magnet hole 36d increases toward the outside in the radial direction from the inside in the radial direction. The pair of first magnet holes 36c and 36d are arranged along a V shape expanding in the circumferential direction outward in the radial direction as viewed in the axial direction. The pair of first magnets 37c and 37d arranged in the pair of first magnet holes 36c and 36d are arranged along a V shape expanding in the circumferential direction outward in the radial direction as viewed in the axial direction.

The second magnet hole 36e is positioned between ends on the outside in the radial direction of the pair of first magnet holes 36c and 36d in the circumferential direction. The second magnet hole 36e extends, for example, substantially linearly in a direction orthogonal to the radial direction as viewed in the axial direction. The second magnet hole 36e, for example, extends in a direction orthogonal to the magnetic pole center line Ld as viewed in the axial direction. The pair of first magnet holes 36c and 36d and the second magnet hole 36e are arranged along, for example, a V shape as viewed in the axial direction. The pair of first magnets 37c and 37d arranged in the pair of first magnet holes 36c and 36d and the second magnet 37e arranged in the second magnet hole 36e are arranged along a V shape as viewed in the axial direction.

The rotor core 32 has a plurality of core holes 37f extending in the axial direction and arranged at intervals in the circumferential direction. The plurality of core holes 37f are arranged on an inter-magnetic pole center line Lq as viewed in the axial direction. The inter-magnetic pole center line Lq is a virtual line that passes through the center in the circumferential direction between the magnetic poles 38 adjacent to each other in the circumferential direction and the central axis J and extends in the radial direction. The inter-magnetic pole center line Lq passes through on a q axis of the rotor 30 as viewed in the axial direction. A direction where the inter-magnetic pole center line Lq extends is a q-axis direction of the rotor 30. The inter-magnetic pole center line Lq is provided in every interval between the magnetic poles 38. The direction where the magnetic pole center line Ld extends and the direction where the inter-magnetic pole center line Lq extends are directions intersecting each other. The magnetic pole center line Ld and the inter-magnetic pole center line Lq are alternately provided along the circumferential direction. Since the core hole 37f is arranged on the inter-magnetic pole center line Lq as described above, a position of the core hole 37f in the circumferential direction includes a center position in the circumferential direction between the magnetic poles 38 adjacent to each other in the circumferential direction.

In the present embodiment, a dimension of the core hole 37f in the circumferential direction decreases toward the outside in the radial direction. In the present embodiment, the core hole 37f has a substantially triangular shape with rounded corners as viewed in the axial direction. An outer portion of the core hole 37f in the radial direction is positioned in the circumferential direction between the first magnet hole 36c in one magnetic pole 38 of the magnetic poles 38 adjacent to each other in the circumferential direction and the first magnet hole 36d in the other magnetic pole 38 of the magnetic poles 38 adjacent to each other in the circumferential direction. An inner portion of the core hole 37f in the radial direction is positioned on the inside in the radial direction with respect to the magnet hole 36h.

As illustrated in FIG. 4, the core hole 37f includes a first core hole 37g and a second core hole 37h. The first core hole 37g is provided in a portion of the rotor core 32 positioned on the right side (−Y side) with respect to the plate 50. The first core hole 37g penetrates, in the axial direction, the plurality of first core pieces 36A positioned on the right side with respect to the plate 50. A plurality of first core holes 37g are arranged at intervals in the circumferential direction. The second core hole 37h is provided in a portion of the rotor core 32 positioned on the left side (+Y side) with respect to the plate 50. The second core hole 37h penetrates, in the axial direction, the plurality of second core pieces 36B positioned on the left side with respect to the plate 50. A plurality of second core holes 37h are arranged at intervals in the circumferential direction. The first core holes 37g and the second core holes 37h are arranged at positions overlapping each other as viewed in the axial direction.

Figure 5:
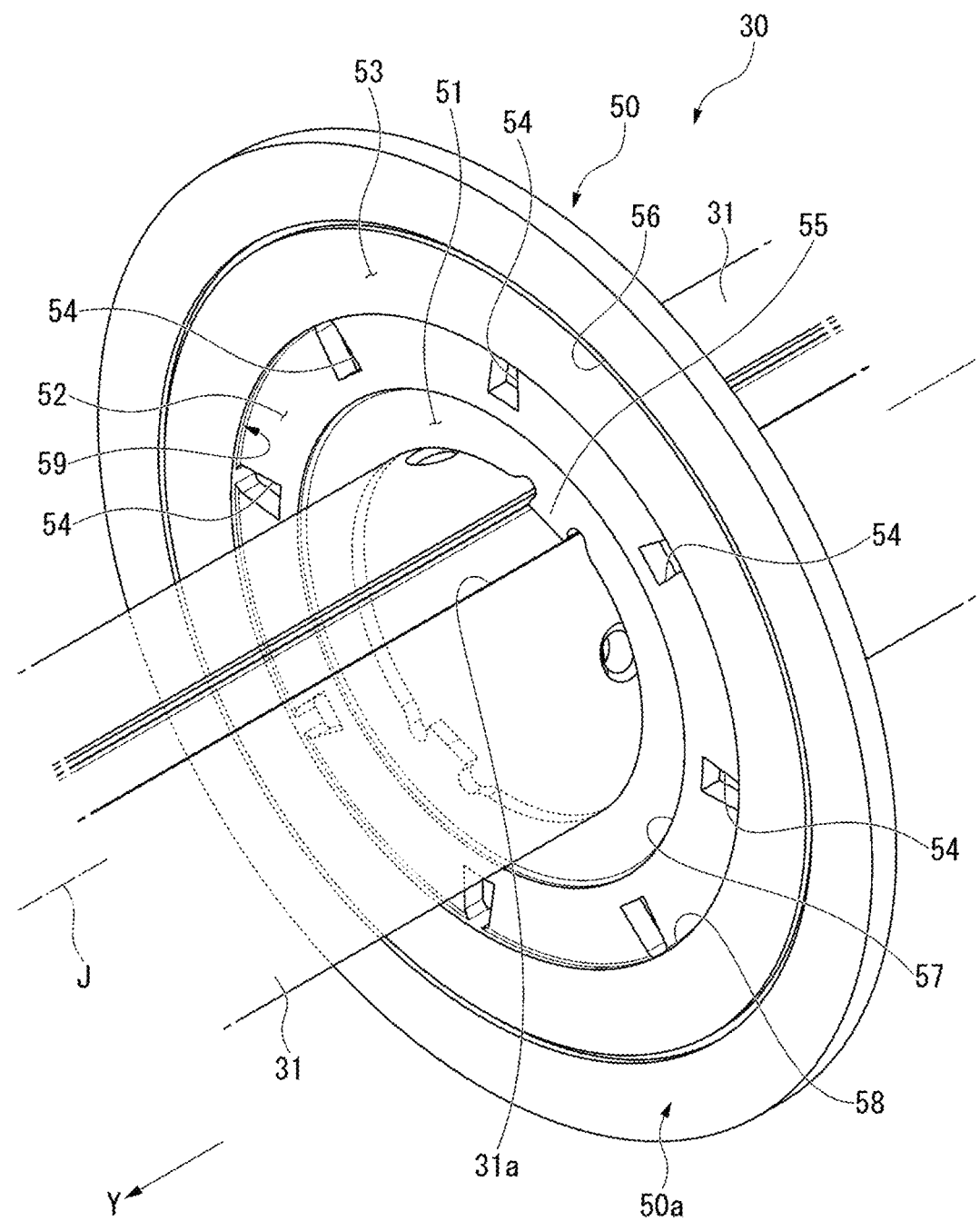
FIG. 5 is a perspective view illustrating a part of a shaft and a plate according to the first embodiment.

The plate 50 is arranged between the core pieces 36 adjacent to each other in the axial direction. In the present embodiment, the plate 50 is positioned between the first core piece 36A and the second core piece 36B in the axial direction. The plate 50 is in contact with the core pieces 36 sandwiching the plate 50 in the axial direction. As illustrated in FIG. 5, the plate 50 has an annular shape surrounding the shaft 31. More particularly, the plate 50 has an annular shape about the central axis J. The plate 50 is in a plate shape in which a plate surface faces the axial direction. A material of the plate 50 is a non-magnetic body. An outer diameter of the plate 50 is slightly smaller than an outer diameter of the rotor core 32.

A left surface 50a which is a surface on the left side (+Y side) of the plate 50, has a first surface 51, a second surface 52, and a third surface 53. In the present embodiment, the first surface 51, the second surface 52, and the third surface 53 have an annular shape surrounding the shaft 31. That is, the first surface 51, the second surface 52, and the third surface 53 extend in the circumferential direction. More specifically, the first surface 51, the second surface 52, and the third surface 53 have an annular shape about the central axis J. In the present embodiment, the first surface 51, the second surface 52, and the third surface 53 are surfaces facing the left side and orthogonal to the axial direction.

The first surface 51 is provided at an inner edge of the plate 50 in the radial direction. An inner edge of the first surface 51 in the radial direction is an inner edge of the left surface 50a in the radial direction. In the present embodiment, the first surface 51 is a surface positioned on the rightmost side (−Y side) of the left surface 50a.

The second surface 52 is positioned on the outside, in the radial direction, with respect to the first surface 51. In the present embodiment, the second surface 52 is connected to the outside of the first surface 51 in the radial direction with a step 57 interposed therebetween. That is, in the present embodiment, the first surface 51 and the second surface 52 are connected in the radial direction with the step 57 interposed therebetween. The step 57 is a step that protrudes leftward (+Y side) when tracing from the first surface 51 to the second surface 52. The second surface 52 is arranged at a position protruding leftward (+Y side) with respect to the first surface 51. The second surface 52 surrounds the first surface 51 as viewed in the axial direction. As illustrated in FIG. 3, the second surface 52 is positioned on the inside in the radial direction with respect to the magnet hole 36h.

The third surface 53 is connected to the outside of the second surface 52 in the radial direction with a step 58 interposed therebetween. The step 58 is a step that protrudes leftward (+Y side) when tracing from the second surface 52 to the third surface 53. The third surface 53 is arranged at a position protruding leftward with respect to the second surface 52. The third surface 53 is provided on an outer edge of the plate 50 in the radial direction. An outer edge of the third surface 53 in the radial direction is an outer edge of the left surface 50a in the radial direction. In the present embodiment, the third surface 53 is a surface positioned on the leftmost side of the left surfaces 50a. A groove 56 extending in the circumferential direction is provided in the third surface 53. The groove 56 is an annular groove surrounding the shaft 31. An operator or the like who handles the plate 50 can easily grasp which surface of the plate 50 is the left surface 50a on which the first surface 51 and the second surface 52 are provided by visually recognizing the groove 56.

As illustrated in FIG. 4, the first surface 51 and the second surface 52 are arranged away from the core piece 36 positioned on the left side (+Y side) of the plate 50 on the right side (−Y side). A gap G1 is provided between the core piece 36 positioned on the left side of the plate 50 and the first surface 51 in the axial direction. A gap G2 is provided between the core piece 36 positioned on the left side of the plate 50 and the second surface 52 in the axial direction. A dimension of the gap G1 in the axial direction is larger than a dimension of the gap G2 in the axial direction. The dimensions of the gaps G1 and G2 in the axial direction is smaller than a dimension of the opening 33c in the axial direction, that is, the inner diameter of the opening 33c. The gaps G1 and G2 are opposite to each other, in the radial direction, a central portion of the opening 33c in the axial direction. The third surface 53 is in contact with the core piece 36 positioned on the left side of the plate 50.

Figure 6:
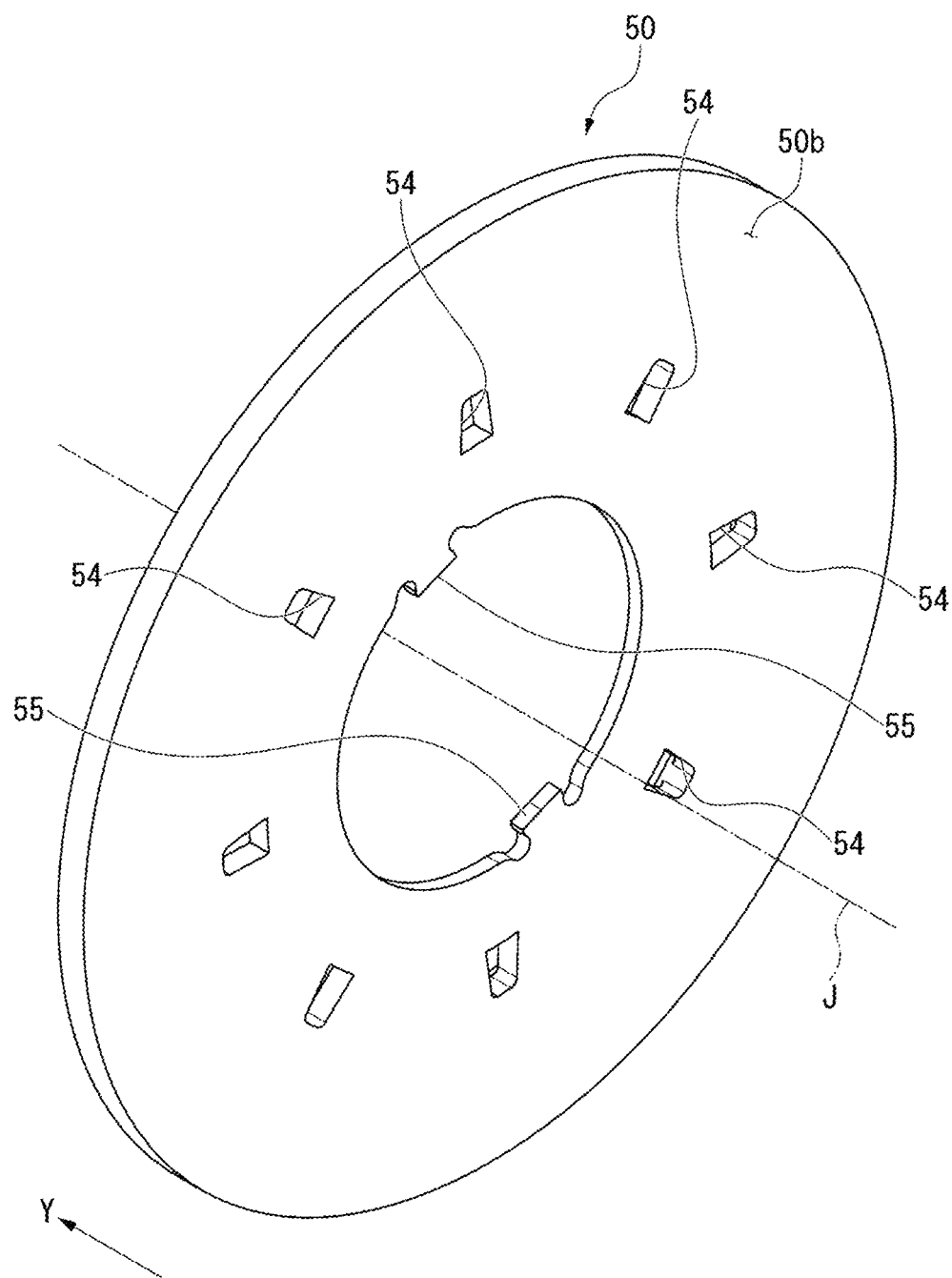
FIG. 6 is a perspective view illustrating the plate according to the first embodiment.

As illustrated in FIG. 6, in the present embodiment, a right surface 50b which is a surface on the right side (-Y side) of the plate 50 is a flat surface. That is, unlike the left surface 50a, a step is not provided in the right surface 50b. In the present embodiment, the right surface 50b is a surface orthogonal to the axial direction. As illustrated in FIG. 4, the right surface 50b is in contact with the core piece 36 positioned on the right side of the plate 50. The gap is not provided between the core piece 36 positioned on the right side of the plate 50 and the right surface 50b in the axial direction.

As illustrated in FIG. 5, the plate 50 has a plurality of plate through-holes 54 provided in the second surface 52. The plurality of plate through-holes 54 penetrates the plate 50 in the axial direction. The plurality of plate through-holes 54 are arranged at intervals in the circumferential direction. More specifically, the plurality of plate through-holes 54 are arranged at equal intervals over the entire circumference along the circumferential direction. As illustrated in FIG. 3, the plurality of plate through-holes 54 are arranged at positions overlapping the inter-magnetic pole center line Lq as viewed in the axial direction. A position of the plate through-hole 54 in the circumferential direction includes the center position in the circumferential direction between the magnetic poles 38 adjacent to each other in the circumferential direction. Each plate through-hole 54 is arranged to be shifted in the circumferential direction with respect to the opening 33c of each of the second shaft holes 33b.

The plurality of plate through-holes 54 overlap the plurality of core holes 37f as viewed in the axial direction. In the present embodiment, the entire plate through-hole 54 overlaps each core hole 37f as viewed in the axial direction. The plate through-hole 54 is smaller than the core hole 37f as viewed in the axial direction. In the present embodiment, the entire inner edge of the plate through-hole 54 is arranged away from the inner edge of the core hole 37f. The plurality of plate through-holes 54 are connected to the plurality of core holes 37f in the axial direction.

In the present embodiment, a dimension of the plate through-hole 54 in the circumferential direction decreases toward the outside in the radial direction. The dimension of the plate through-hole 54 in the circumferential direction is smaller than a distance in the circumferential direction between the plate through-holes 54 adjacent in the circumferential direction. The plate through-hole 54 has a substantially trapezoidal shape as viewed in the axial direction. An outer edge of the plate through-hole 54 in the radial direction is positioned on an outer edge of the second surface 52 in the radial direction.

As illustrated in FIG. 5, the plate 50 has a plate wall 59. The plate wall 59 is a wall protruding leftward (+Y side) from a portion of the first surface 51 positioned on the outside, in the radial direction, with respect to the inner edge in the radial direction. More specifically, the plate wall 59 protrudes leftward from the outer edge of the first surface 51 in the radial direction. The plate wall 59 extends in the circumferential direction. In the present embodiment, the plate wall 59 has an annular shape surrounding the shaft 31. More specifically, the plate wall 59 has an annular shape about the central axis J. In the present embodiment, the plate wall 59 is formed by the step 57 between the first surface 51 and the second surface 52. An inner surface of the plate wall 59 in the radial direction is a step surface facing the inside in the step 57 in the radial direction. As illustrated in FIGS. 3 and 4, a part of the plate wall 59 is arranged opposite to the outside of the opening 33c in the radial direction at an interval. That is, in the present embodiment, the opening 33c is opposite to the plate wall 59.

As illustrated in FIG. 5, the plate 50 has a fitting protrusion 55. The fitting protrusion 55 is provided on the inner edge of the plate 50 in the radial direction. The fitting protrusion 55 protrudes toward the inside in the radial direction. The fitting protrusion 55 is fitted in a fitting recess 31a provided on the outer peripheral surface of the shaft 31. As a result, the plate 50 is positioned in the circumferential direction with respect to the shaft 31. The fitting recess 31a extends in the axial direction. A pair of fitting protrusions 55 and a pair of fitting recesses 31a are provided with the central axis J interposed therebetween.

As illustrated in FIG. 1, the stator 40 is opposite to the rotor 30 in the radial direction with a gap interposed therebetween. The stator 40 surrounds the rotor 30 from the outside in the radial direction over the entire circumference in the circumferential direction. The stator 40 is fixed inside the motor housing 81. The stator 40 includes a stator core 41 and a coil assembly 42.

The stator core 41 is in an annular shape surrounding the central axis J of the rotary electric machine 10. The stator core 41 includes, for example, plate members such as electromagnetic steel plates stacked in the axial direction. The coil assembly 42 includes a plurality of coils 42c attached to the stator core 41 along the circumferential direction. The plurality of coils 42c are attached to teeth of the stator core 41 with insulators (not illustrated) interposed therebetween. The plurality of coils 42c are arranged along the circumferential direction. The coil 42c has a portion protruding in the axial direction from the stator core 41.

The flow path 90 is provided in the housing 80. The oil O as a fluid flows through the flow path 90. The flow path 90 is provided across the inside of the motor housing 81 and the inside of the gear housing 82. The flow path 90 allows the oil O stored in the gear housing 82 to be supplied to the rotary electric machine 10 in the motor housing 81 and to return to the inside of the gear housing 82 again. A pump 71 and a cooler 72 are provided in the flow path 90. The flow path 90 includes a first flow path portion 91, a second flow path portion 92, a third flow path portion 93, a fluid supply portion 70, an in-shaft flow path portion 95, a connection flow path portion 94, a plate flow path portion 96, an in-rotor core flow path portion 98, and a guide flow path portion 97.

The first flow path portion 91, the second flow path portion 92, and the third flow path portion 93 are provided, for example, in a wall of the gear housing 82. The first flow path portion 91 connects a portion in which the oil O is stored inside the gear housing 82 with the pump 71. The second flow path portion 92 connects the pump 71 with the cooler 72. The third flow path portion 93 connects the cooler 72 with the fluid supply portion 70. In the present embodiment, the third flow path portion 93 is connected to an end on the left side of the fluid supply portion 70, that is, an upstream portion of the fluid supply portion 70.

The fluid supply portion 70 supplies the oil O to the stator 40. In the present embodiment, the fluid supply portion 70 is in a tubular shape extending in the axial direction. In other words, in the present embodiment, the fluid supply portion 70 is a pipe extending in the axial direction. Both ends of the fluid supply portion 70 in the axial direction are supported by the motor housing 81. The end on the left side of the fluid supply portion 70 is supported by, for example, the partition wall 81b. An end on the right side of the fluid supply portion 70 is supported by, for example, the lid 81c. The fluid supply portion 70 is positioned on the outside of the stator 40 in the radial direction. In the present embodiment, the fluid supply portion 70 is positioned above the stator 40.

The fluid supply portion 70 has a supply port 70a for supplying the oil O to the stator 40. In the present embodiment, the supply port 70a is an injection port that injects a part of the oil O having flowed into the fluid supply portion 70 to the outside of the fluid supply portion 70. The supply port 70a is formed by a hole penetrating the wall of the fluid supply portion 70 from an inner peripheral surface to an outer peripheral surface. A plurality of supply ports 70a are provided in the fluid supply portion 70. The plurality of supply ports 70a are arranged at intervals in the axial direction or the circumferential direction, for example.

The connection flow path portion 94 connects the fluid supply portion 70 and the in-shaft flow path portion 95. In the present embodiment, the connection flow path portion 94 is provided in the lid 81c. The in-shaft flow path portion 95 is formed by the inside of the hollow shaft 31. The in-shaft flow path portion 95 extends in the axial direction. The in-shaft flow path portion 95 is arranged across the inside of the motor housing 81 and the inside of the gear housing 82.

The plate flow path portion 96 connects the in-shaft flow path portion 95 and the in-rotor core flow path portion 98. As illustrated in FIG. 4, the plate flow path portion 96 is formed by the plate 50 and the core piece 36 positioned on the left side (+Y side) of the plate 50. The inside of the plate flow path portion 96 is formed by the gaps G1 and G2 provided between the plate 50 and the core piece 36 in the axial direction. The plate flow path portion 96 is connected to the in-shaft flow path portion 95 with the second shaft hole 33b interposed therebetween.

The in-rotor core flow path portion 98 is formed by each of the plurality of core holes 37f. That is, a plurality of in-rotor core flow path portions 98 are provided at intervals in the circumferential direction. As illustrated in FIG. 1, the in-rotor core flow path portion 98 connects the plate flow path portion 96 and the guide flow path portion 97. As illustrated in FIG. 2, the guide flow path portion 97 is provided in each of the pair of end plates 39. In each end plate 39, a plurality of guide flow path portions 97 are provided at intervals in the circumferential direction. Each guide flow path portion 97 is connected to an end of each core hole 37f in the axial direction. The guide flow path portion 97 extends in the radial direction. The guide flow path portion 97 is opened outward in the radial direction.

As illustrated in FIG. 1, when the pump 71 is driven, the oil O stored in the gear housing 82 passes through the first flow path portion 91, is sucked up, and flows into the cooler 72 through the second flow path portion 92. The oil O having flowed into the cooler 72 is cooled in the cooler 72, then passes through the third flow path portion 93, and flows into the fluid supply portion 70. A part of the oil O having flowed into the fluid supply portion 70 is injected from the supply port 70a and is supplied to the stator 40. A part of the oil O having flowed into the fluid supply portion 70 also passes through the connection flow path portion 94, and flows into the in-shaft flow path portion 95.

As illustrated in FIG. 4, a part of the oil O flowing through the in-shaft flow path portion 95 flows from the second shaft hole 33b into the gaps G1 and G2 between the plate 50 and the core piece 36, that is, the plate flow path portion 96. In the plate flow path portion 96, the oil O flows from the gap G1 to the gap G2. The oil O having flowed into the plate flow path portion 96 flows into the in-rotor core flow path portion 98 from the gap G2. More specifically, a part of the oil O having flowed into the plate flow path portion 96 passes through the plate through-hole 54 from the gap G2 and flows into the first core hole 37g provided in a portion of the rotor core 32 positioned on the right side (−Y side) of the plate 50. Another part of the oil O having flowed into the plate flow path portion 96 flows into the second core hole 37h provided in a portion of the rotor core 32 positioned on the left side (+Y side) of the plate 50 from the gap G2.

As illustrated in FIG. 1, the oil O having flowed into the in-rotor core flow path portion 98 flows through the guide flow path portion 97 and scatters to the stator 40. Another part of the oil O having flowed into the in-shaft flow path portion 95 is discharged into the gear housing 82 from a left opening of the shaft 31, and is stored in the gear housing 82 again.

The oil O supplied from the supply port 70a to the stator 40 takes heat from the stator 40, and the oil O supplied from the shaft 31 to the rotor 30 and the stator 40 takes heat from the rotor 30 and the stator 40. The oil O having cooled the stator 40 and the rotor 30 falls downward to accumulate in a lower region in the motor housing 81. The oil O accumulated in the lower region in the motor housing 81 returns to the inside of the gear housing 82 through the partition wall opening 81d provided in the partition wall 81b. As described above, the flow path 90 allows the oil O stored in the gear housing 82 to be supplied to the rotor 30 and the stator 40.

According to the present embodiment, the plate 50 has the plate wall 59 protruding leftward (+Y side) from the portion of the first surface 51 positioned on the outside, in the radial direction, with respect to the inner edge in the radial direction. Thus, as illustrated in FIG. 3, at least a part of the oil O having flowed into the gap G1 between the first surface 51 of the plate 50 and the core piece 36 flows outward in the radial direction and hits the plate wall 59. Since the plate wall 59 extends in the circumferential direction, the oil O having hit the plate wall 59 flows in the circumferential direction along the plate wall 59. In the example of FIG. 3, the oil O having hit the plate wall 59 diverges and flows to both sides in the circumferential direction along the plate wall 59. As a result, the oil O having flowed into the gap G1 from the second shaft hole 33b can be spread in the circumferential direction. Therefore, the oil O having flowed from the gap G1 between the first surface 51 and the core piece 36 to the gap G2 between the second surface 52 and the core piece 36 can flow into the plurality of plate through-holes 54 arranged at intervals in the circumferential direction on the second surface 52 in a well-balanced manner. That is, the amount of oil O flowing through the plurality of plate through-holes 54 can be suppressed from varying. Thus, it is possible to suppress the amount of oil O supplied to the rotor core 32 via the plurality of plate through-holes 54 from varying in the circumferential direction. As a result, it is possible to suppress the non-uniform in the supply of the oil O to the rotor core 32 via the plate 50. Therefore, the rotor core 32 and the magnet 37 can be suitably cooled by the oil O.

The magnet 37 can be suitably cooled, and thus, a temperature of the magnet 37 can be suppressed from becoming high, and the magnet 37 can be suitably suppressed from being demagnetized. Thus, it is possible to suppress the output torque of the rotary electric machine 10 from decreasing. As a result, even though an inexpensive magnet having a relatively small magnetic force is used as the magnet 37, the output torque of the rotary electric machine 10 can be maintained. Therefore, the manufacturing cost of the drive apparatus 100 can be reduced by using the inexpensive magnet 37 while maintaining the output of the drive apparatus 100.

According to the present embodiment, the opening 33c of the second shaft hole 33b is opposite to the plate wall 59. Thus, the oil O having flowed from the opening 33c into the gap G1 between the plate 50 and the core piece 36 easily hits the plate wall 59. As a result, the oil O can be more suitably spread in the circumferential direction along the plate wall 59. Therefore, it is possible to further suppress the amount of oil O supplied to the rotor core 32 via the plurality of plate through-holes 54 from varying in the circumferential direction.

According to the present embodiment, the plate wall 59 has an annular shape surrounding the shaft 31. Thus, the oil O having flowed into the gap G1 between the plate 50 and the core piece 36 from the opening 33c can be more easily applied to the plate wall 59. As a result, the oil O can be more suitably spread in the circumferential direction along the plate wall 59.

According to the present embodiment, the first surface 51 and the second surface 52 have an annular shape surrounding the shaft 31. Thus, the oil O in the gaps G1 and G2 can easily flow in the circumferential direction along the first surface 51 and the second surface 52. As a result, the oil O can be more suitably spread in the circumferential direction.

According to the present embodiment, the position of the opening 33c in the circumferential direction is a position in the circumferential direction between the plate through-holes 54 adjacent to each other in the circumferential direction. Thus, it is possible to suppress the oil O having flowed into the gap G1 from the opening 33c from flowing outward in the radial direction and directly flowing into the plate through-hole 54. As a result, the oil O having flowed into the gap G1 can be suitably spread in the circumferential direction by the plate wall 59 and the like, and then, can flow into the plate through-hole 54. Therefore, the oil O flowing from the opening 33c can be suppressed from flowing into only one plate through-hole 54, and the amount of oil O flowing into the plurality of plate through-holes 54 can be further suppressed from varying.

According to the present embodiment, the second surface 52 is arranged at a position protruding leftward (+Y side) with respect to the first surface 51. The first surface 51 and the second surface 52 are connected in the radial direction with the step 57 interposed therebetween. The plate wall 59 is formed by the step 57. Thus, the oil O spreading in the circumferential direction by the plate wall 59 and having flowed on the second surface 52 can be more easily spread on the second surface 52 as it is. As a result, the oil O can more suitably flow into each of the plate through-holes 54 provided in the second surface 52.

According to the present embodiment, the left surface 50a of the plate 50 has the third surface 53 connected to the outside of the second surface 52 in the radial direction with the step 58 interposed therebetween. The third surface 53 is arranged at a position protruding leftward with respect to the second surface 52. Thus, the oil O flowing outward in the radial direction in the gap G2 between the second surface 52 and the core piece 36 can hit the step 58 and can be spread in the circumferential direction. As a result, the oil O can be more easily spread in the circumferential direction on the second surface 52.

According to the present embodiment, each of the plurality of core holes 37f is connected to each of the plurality of plate through-holes 54. Thus, the oil O having flowed into each plate through-hole 54 can flow into each core hole 37f. As a result, the rotor core 32 and the magnet 37 can be more suitably cooled by the oil O.

According to the present embodiment, the entire plate through-hole 54 overlaps the core hole 37f as viewed in the axial direction. The plate through-hole 54 is smaller than the core hole 37f as viewed in the axial direction. The amount of oil O flowing into each plate through-hole 54 is reduced by setting each plate through-hole 54 to be relatively small in this manner, it is possible to further suppress the variation in the amount of oil O flowing into each plate through-hole 54. The entire plate through-hole 54 overlaps the core hole 37f as viewed in the axial direction, and thus, it is easy to allow all of the oil O having flowed into the plate through-hole 54 to suitably flow into the core hole 37f.

According to the present embodiment, the position of the plate through-hole 54 in the circumferential direction and the position of the core hole 37f in the circumferential direction include the center position in the circumferential direction between the magnetic poles 38 adjacent to each other in the circumferential direction. Thus, it is possible to easily allow the oil O to flow into the core hole 37f from the plate through-hole 54 while providing the core hole 37f at a position that hardly affects a flow of a magnetic flux generated in the magnetic pole 38.

According to the present embodiment, the dimension of the core hole 37f in the circumferential direction decreases toward the outside in the radial direction. Thus, it is easy to form the edge of the core hole 37f in the circumferential direction into a shape along the first magnet 37c or the first magnet 37d arranged along the V shape. As a result, the magnetic flux can easily flow between the core hole 37f and the first magnets 37c and 37d, and the magnetic flux can suitably flow in the rotor core 32. The dimension of the plate through-hole 54 in the circumferential direction decreases toward the outside in the radial direction. Thus, the shape of the plate through-hole 54 can be easily set to be close to the shape of the core hole 37f, and the entire plate through-hole 54 can be easily arranged to overlap the core hole 37f in the axial direction.

According to the present embodiment, the second surface 52 is positioned on the inside in the radial direction with respect to the magnet hole 36h. Thus, the plate through-hole 54 provided in the second surface 52 and the step 58 provided between the second surface 52 and the third surface 53 can be arranged on the inside in the radial direction with respect to the magnet hole 36h. As a result, the plate through-hole 54 and the step 58 can be provided at positions that hardly affect a magnetic flux flowing through the rotor core 32.

According to the present embodiment, the dimension of the plate through-hole 54 in the circumferential direction is smaller than the distance in the circumferential direction between the plate through-holes 54 adjacent to each other in the circumferential direction. Thus, the plate through-hole 54 can be made relatively small. As a result, the amount of oil O flowing into each plate through-hole 54 can be more suitably reduced, and the variation in the amount of oil O flowing into each plate through-hole 54 can be further suppressed.

According to the present embodiment, the right surface 50*b* of the plate 50 is a flat surface. Thus, the right surface 50*b* and the core piece 36 positioned on the right side of the plate 50 can be suitably in contact with each other. As a result, even though the material of the plate 50 and the material of the core piece 36 are different materials, the plate 50 and the core piece 36 can be suitably in contact and connected.

According to the present embodiment, the material of the plate 50 is a non-magnetic body. Thus, the plate 50 does not affect the magnetic flux flowing through the rotor core 32. As a result, it is possible to prevent the oil O supplied to the rotor core 32 by the plate 50 from becoming non-uniform without inhibiting the magnetic flux flowing through the rotor core 32 by the plate 50.

Figure 7:
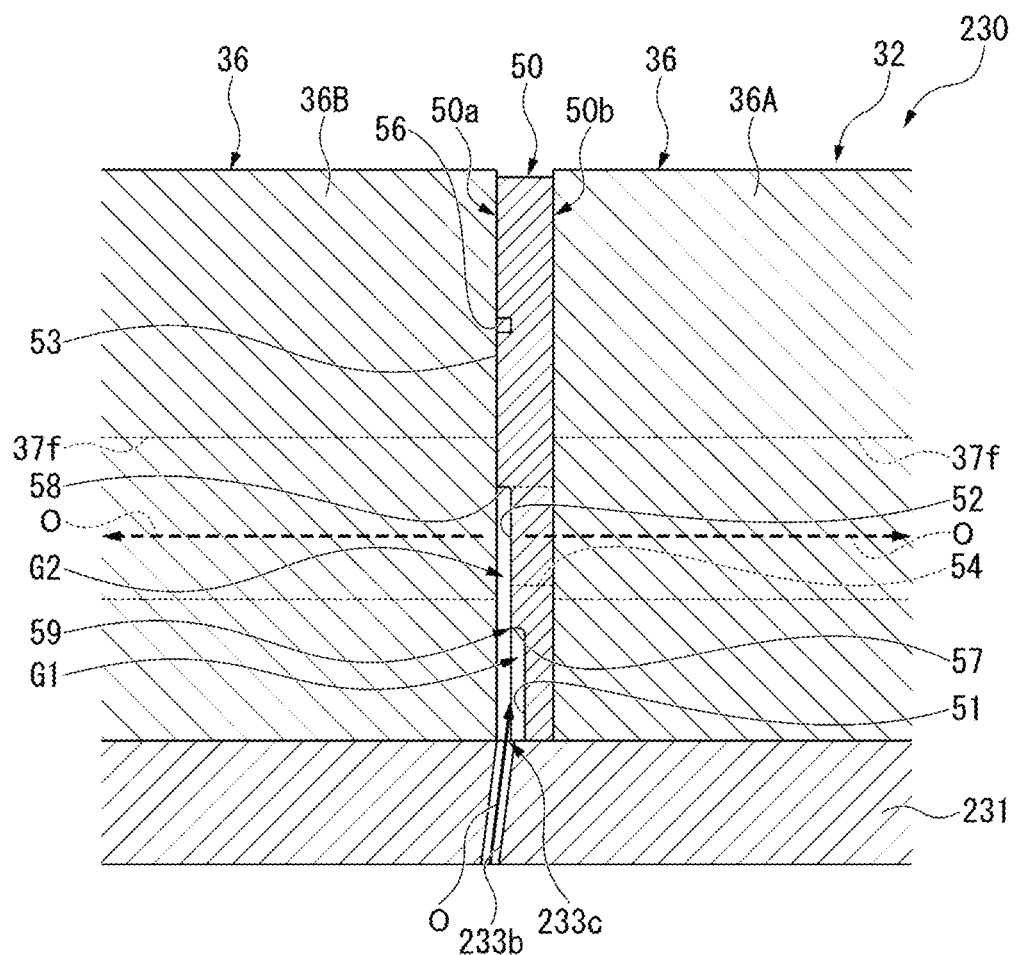
FIG. 7 is a cross-sectional view illustrating a part of a rotor according to a second embodiment.

Hereinafter, configurations similar to the configurations of the above-described embodiment are denoted by the same reference signs as appropriate, and the description thereof may be omitted. As illustrated in FIG. 7, in a rotor 230 according to the present embodiment, a second shaft hole 233*b* extends obliquely in the axial direction with respect to the radial direction. The second shaft hole 233*b* is positioned on the right side (−Y side) outward in the radial direction. An opening 233*c* of the second shaft hole 233*b* is opened to an outer peripheral surface of a shaft 231. In the present embodiment, a dimension of the opening 233*c* in the axial direction, that is, an inner diameter of the opening 233*c* is smaller than the dimension of the gap G1 in the axial direction. The entire opening 233*c* is opened to the gap G1. The opening 233*c* is opened in a direction opposite to the plate wall 59. Other configurations of the rotor 230 are similar to the other configurations of the rotor 30 according to the first embodiment.

Figure 8:
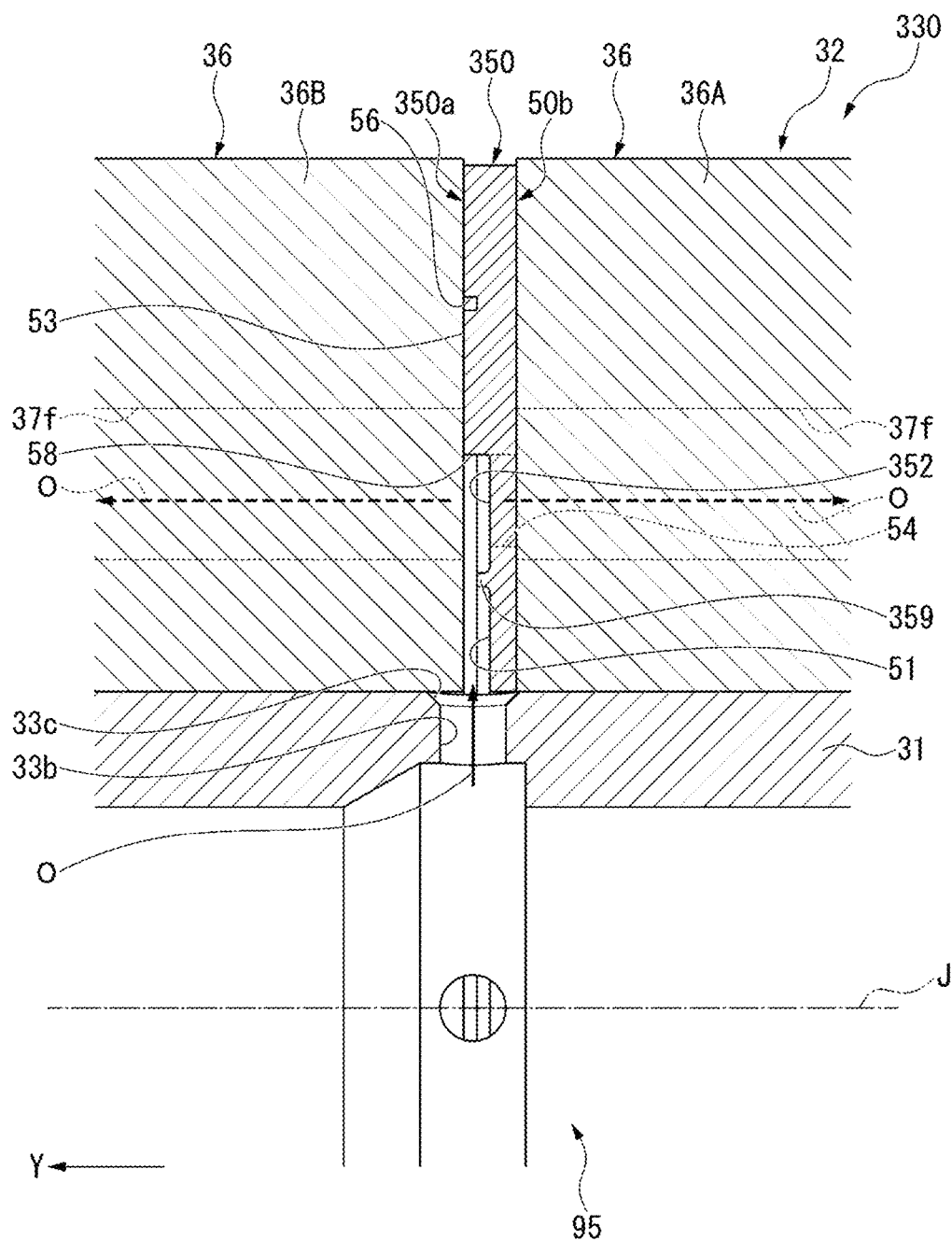
FIG. 8 is a cross-sectional view illustrating a part of a rotor according to a third embodiment.

Hereinafter, configurations similar to the configurations of the above-described embodiment are denoted by the same reference signs as appropriate, and the description thereof may be omitted. As illustrated in FIG. 8, in a plate 350 of a rotor 330 according to the present embodiment, a plate wall 359 provided on a left surface 350*a* protrudes leftward (+Y side) from the first surface 51 and a second surface 352. Although not illustrated, the plate wall 359 has an annular shape about the central axis J as in the first embodiment. An end on the left side of the plate wall 359 is positioned on the right side (−Y side) with respect to the third surface 53.

The second surface 352 is positioned on the right side (−Y side) with respect to an end on the left side (+Y side) of the plate wall 359. Thus, the plate wall 359 can suppress the oil O having flowed over the plate wall 359 outward in the radial direction and into the gap between the second surface 352 and the core piece 36 from flowing back between the first surface 51 and the core piece 36. In the present embodiment, the position of the second surface 352 in the axial direction is the same as the position of the first surface 51 in the axial direction. Note that, the second surface 352 may be positioned on the right side with respect to the end on the left side of the plate wall 359 and on the left side with respect to the first surface 51, or may be positioned on the right side with respect to the first surface 51. Other configurations of the rotor 330 are similar to the other configurations of the rotor 30 according to the first embodiment.

Figure 9:
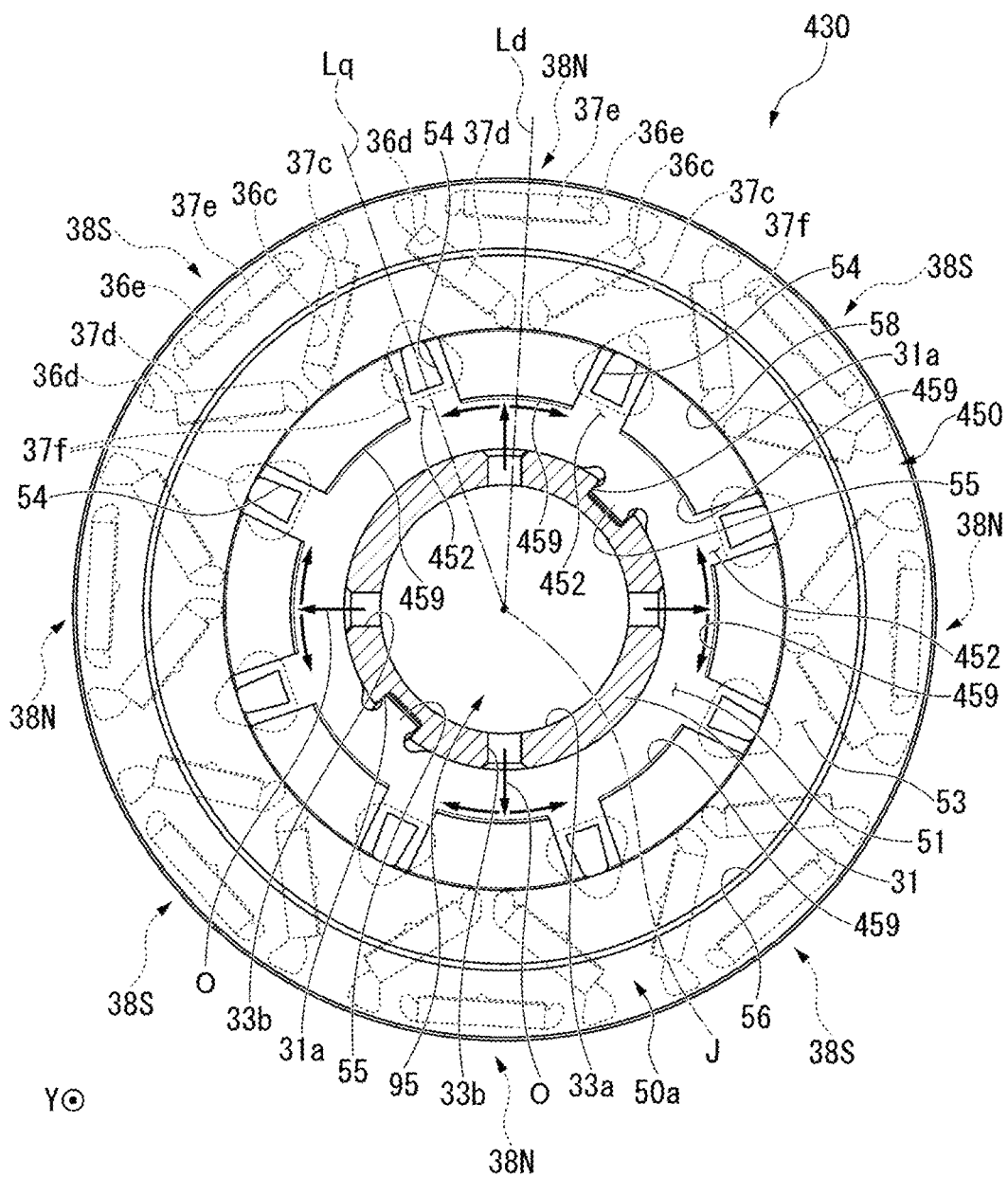
FIG. 9 is a sectional view illustrating a rotor according to a fourth embodiment.

Hereinafter, configurations similar to the configurations of the above-described embodiment are denoted by the same reference signs as appropriate, and the description thereof may be omitted. As illustrated in FIG. 9, in a plate 450 of a rotor 430 of the present embodiment, a plurality of plate walls 459 are arranged at intervals in the circumferential direction. The plurality of plate walls 459 are arranged at equal intervals over the entire circumference along the circumferential direction. Each plate wall 459 has a substantially arc shape extending in the circumferential direction. The plate wall 459 protrudes leftward (+Y side) from the first surface 51 and a second surface 452.

In the present embodiment, the second surface 452 is provided between the plate walls 459 adjacent to each other in the circumferential direction. Each second surface 452 is connected to the outside of the first surface 51 in the radial direction without a step. Each second surface 452 is positioned on the right side (−Y side) with respect to the surface on the left side (+Y side) of each plate wall 459. Each second surface 452 protrudes outward in the radial direction from the first surface 51. One plate through-hole 54 is provided in the second surface 452. Other configurations of the rotor 430 are similar to the other configurations of the rotor 30 according to the first embodiment.

According to the present embodiment, the second surface 452 is positioned between the plate walls 459 adjacent to each other in the circumferential direction, and is connected to the outside of the first surface 51 in the radial direction without a step. Thus, the oil O spread in the circumferential direction by the plate wall 459 can flow from the second surface 452 to the plate through-hole 54 without causing the plate wall 459 to flow over the outside in the radial direction. As a result, it is easier for the oil O to flow into the plate through-hole 54.

The present invention is not limited to the above-described embodiments, and other configurations and other methods may be employed within the scope of the technical idea of the present invention. The surface on one side in the axial direction of the plate may have any configuration as long as the surface has the first surface and the second surface. The relative positional relationship between the first surface and the second surface in the axial direction is not particularly limited. The surface on one side of the plate in the axial direction may not have the third surface. The surface on the other side of the plate in the axial direction may be any surface. A step may be provided on the surface on the other side of the plate in the axial direction. The plurality of plate through-holes may have any shape.

The plate wall may have any shape as long as the plate wall protrudes to one side in the axial direction from the portion of the first surface positioned on the outside, in the radial direction, with respect to the inner edge in the radial direction and extends in the circumferential direction. The relative positional relationship between the plate wall and the second shaft hole in the circumferential direction is not particularly limited. The flow path that allows the fluid to be supplied to the rotor core or the like may have any structure. The fluid flowing through the flow path may be any kind of fluid. The rotor core may not have the core hole. The rotor may be a non-skewed rotor. The rotor may have another member arranged in the axial direction of the plate and the core piece. In this case, the fluid may flow from the second shaft hole into the gap in the axial direction between the other member and the first surface and the gap in the axial direction between the other member and the second surface. The first shaft hole provided in the shaft may be a hole having a bottom on at least one of both sides in the axial direction.

The rotary electric machine to which the present invention is applied is not limited to a motor, and may be a generator. The application of the rotary electric machine is not particularly limited. The rotary electric machine may be mounted in a device other than the vehicle. The application of the drive apparatus to which the present invention is applied is not particularly limited. For example, the drive apparatus may be mounted in a vehicle for a purpose other than the purpose of rotating the axle, or may be mounted on a device other than the vehicle. The posture when the rotary electric machine and the drive apparatus are used is not particularly limited. The central axis of the rotary electric machine may be inclined with respect to the horizontal direction orthogonal to the vertical direction or may extend in the vertical direction. The features described above in the present description may be appropriately combined as long as no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor that is rotatable about a central axis, comprising:
a shaft that extends in an axial direction;
a rotor core that has a plurality of core pieces arranged in the axial direction and is fixed to an outer peripheral surface of the shaft; and
an annular plate that is arranged between the core pieces adjacent in the axial direction and surrounds the shaft, wherein the shaft includes
a first shaft hole that extends in the axial direction, and
a second shaft hole that has an opening opened to the outer peripheral surface of the shaft and is connected to the first shaft hole,
a surface on one side of the plate in the axial direction has
a first surface that is provided at an inner edge of the plate in a radial direction and extends in a circumferential direction, and
a second surface that is positioned on an outside, in the radial direction, with respect to the first surface,
the first surface and the second surface are arranged away from the core piece, which is positioned on the one side of the plate in the axial direction, toward another side in the axial direction, and
the plate includes
a plurality of plate through-holes that are provided on the second surface and are arranged at intervals in the circumferential direction, and
a plate wall that protrudes to one side in the axial direction from a portion of the first surface positioned on an outside, in the radial direction, with respect to an inner edge in the radial direction, and extends in the circumferential direction.

2. The rotor according to claim 1, wherein the opening is opposite to the plate wall.

3. The rotor according to claim 1, wherein the plate wall has an annular shape surrounding the shaft.

4. The rotor according to claim 1, wherein the first surface and the second surface have an annular shape surrounding the shaft.

5. The rotor according to claim 1, wherein a position of the opening in the circumferential direction is a position in the circumferential direction between the plate through-holes adjacent to each other in the circumferential direction.

6. The rotor according to claim 1, wherein
the second surface is arranged on a position protruding to one side in the axial direction, with respect to the first surface,
the first surface and the second surface are connected in the radial direction with a step interposed therebetween, and
the plate wall includes the step.

7. The rotor according to claim 1, wherein the second surface is positioned closer to another side of the plate wall in the axial direction, with respect to an end on one side of the plate wall in the axial direction.

8. The rotor according to claim 1, wherein
a surface on one side of the plate in the axial direction has a third surface connected to an outside of the second surface in the radial direction with a step interposed therebetween, and
the third surface is arranged at a position protruding to one side in the axial direction, with respect to the second surface.

9. The rotor according to claim 1, wherein
the rotor core includes a plurality of core holes extending in the axial direction and arranged at intervals in the circumferential direction, and
each of the plurality of core holes is connected to each of the plurality of plate through-holes.

10. The rotor according to claim 9, wherein
the entire plate through-hole overlaps the core hole as viewed in the axial direction, and
the plate through-hole is smaller than the core hole as viewed in the axial direction.

11. The rotor according to claim 9, comprising a plurality of magnetic poles that are arranged at intervals in the circumferential direction,
wherein a position of the plate through-hole in the circumferential direction and a position of the core hole in the circumferential direction include a center position in the circumferential direction between the magnetic poles adjacent to each other in the circumferential direction.

12. The rotor according to claim 11, wherein
a dimension of the core hole in the circumferential direction decreases toward an outside in the radial direction, and
a dimension of the plate through-hole in the circumferential direction decreases toward the outside in the radial direction.

13. The rotor according to claim 11, wherein
the magnetic pole has a magnet hole in which a magnet is arranged, and
the second surface is position on an inside in the radial direction with respect to the magnet hole.

14. The rotor according to claim 1, wherein a dimension of the plate through-hole in the circumferential direction is smaller than a distance in the circumferential direction between the plate through-holes adjacent to each other in the circumferential direction.

15. The rotor according to claim 1, wherein a surface on another side of the plate in the axial direction is a flat surface.

16. The rotor according to claim 1, wherein a material of the plate is a non-magnetic body.

17. A rotary electric machine comprising:
the rotor according to claim 1; and
a stator that is opposite to the rotor with a gap interposed therebetween.

18. A drive apparatus comprising:
the rotary electric machine according to claim 17; and
a gear mechanism that is connected to the rotary electric machine.

\* \* \* \* \*